United States Patent [19]

Dahlström

[11] 4,287,459

[45] Sep. 1, 1981

[54] METHOD FOR GENERATING A PATTERN BY MEANS OF AN INDUSTRIAL ROBOT AND INDUSTRIAL ROBOT FOR CARRYING OUT THE METHOD

[75] Inventor: Lars Dahlström, Vesterås, Sweden

[73] Assignee: ASEA Aktiebolag, Vesterås, Sweden

[21] Appl. No.: 92,243

[22] Filed: Nov. 6, 1979

[30] Foreign Application Priority Data

Nov. 27, 1978 [SE] Sweden .................. 7812165

[51] Int. Cl.$^3$ ............................................. G05B 19/42
[52] U.S. Cl. .................................... 318/568; 364/478; 414/730
[58] Field of Search ......................... 318/568, 567, 569; 414/4, 730; 364/478

[56] References Cited

U.S. PATENT DOCUMENTS

| 4,011,437 | 3/1977 | Hohn | 318/568 X |
| 4,107,592 | 8/1978 | Bayer | 318/568 |
| 4,132,938 | 1/1979 | Sano et al. | 318/569 |
| 4,136,306 | 1/1979 | Westlund et al. | 318/568 |
| 4,187,454 | 2/1980 | Ito | 318/568 |
| 4,201,937 | 5/1980 | Irie | 318/568 |

Primary Examiner—B. Dobeck
Attorney, Agent, or Firm—Pollock, Vande Sande & Priddy

[57] ABSTRACT

An industrial robot (1–10) is arranged to position workpieces (OP) in a unidimensional or multidimensional pattern or to collect workpieces located in such a pattern. The robot is first controlled to a predetermined preliminary position (e.g. P'$_O$) and thereafter to its final position in the pattern by way of sensing members (9). The preliminary position for a workpiece is calculated with the final position of an adjacent workpiece as the starting point. To this position is added a vector corresponding to the spacing of the pattern. The spacing is calculated as the difference between the coordinates for the final positions of two workpieces located adjacent to the workpiece in question.

10 Claims, 8 Drawing Figures

$\Delta_1 = P_{klm} - P_{(k-1)lm}$ $\Delta_1' = P_{2(l-1)m} - P_{1(l-1)m}$ $\Delta_1'' = P_{21(m-1)} - P_{11(m-1)}$ $\Delta_2 = P_{1lm} - P_{1(l-1)m}$ $\Delta_2' = P_{12(m-1)} - P_{11(m-1)}$ $\Delta_3 = P_{11m} - P_{11(m-1)}$

METHOD FOR GENERATING A PATTERN BY MEANS OF AN INDUSTRIAL ROBOT AND INDUSTRIAL ROBOT FOR CARRYING OUT THE METHOD

The present invention relates to a method for generating a pattern by means of an industrial robot and also relates to an industrial robot for carrying out the method.

Within many fields of application an industrial robot is used for moving workpieces from a collection point to a delivery point. (A workpiece is an object handled by the robot). The collection point or the delivery point (or both) may consist of a magazine accomodating a number of identical or substantially identical workpieces and in which the workpieces are arranged or shall be arranged in a regular pattern. One example of such a magazine is for the collection point a pallet on which a number of right-angled parallelepipedic boxes are stacked in several layers, each layer containing a plurality of rows and each row a plurality of boxes. An example of the magazine for the delivery point is a larger right-angled box, in which the above-mentioned boxes shall be placed in a corresponding manner.

If the robot is programmed to collect the workpieces from, or deliver them to such a magazine, it would be a natural thing to program one point for each workpiece in the pattern so that the robot runs from point to point in the pattern and at each point collects or delivers a workpiece. If the number of workpieces in the pattern is great, the programming work will be extremely time-consuming and a considerable memory capacity of the control system of the robot is required.

If the workpieces are positioned in or shall be positioned in a regular pattern, it is possible to enter information into the program which defines the position and orientation of the pattern as well as the characteristic properties of the pattern. Thereafter, the control system can be arranged, with the guidance of the programmed information for each workpiece, to estimate the position of the workpiece and control the robot to this position. Especially if the geometry of movement of the robot is complex, for example in case of an anthropomorphic robot, a very great calculating capacity of the control system of the robot is required for this type of control, and the complexity as well as the price of the control system will be high.

Common for both of the above-mentioned principles of control is that it may be difficult or impossible to make them work if variations in the size, shape, orientation or location of the workpieces exceed very close limits.

The invention aims to provide a method of the kind mentioned in the introduction, by which a unidimensional, two-dimensional, or three-dimensional pattern may be generated by means of an industrial robot. The method shall be simple and quick to program, and it shall be able to be realized with a limited memory capacity of the control system of the robot. Further, the method shall be such that allowance can be made in a simple manner for variations in the pattern.

The invention also relates to an industrial robot for carrying out the method.

What characterises a method and a robot according to the invention will be clear from the appended claims.

An example of a possible realization of the invention will be described in the following with reference to the accompanying FIGS. 1 to 4.

FIG. 1a shows an industrial robot arranged to collect workpieces from a specified collection point and to place the workpieces in a predetermined three-dimensional pattern in a magazine.

Figure 1A:
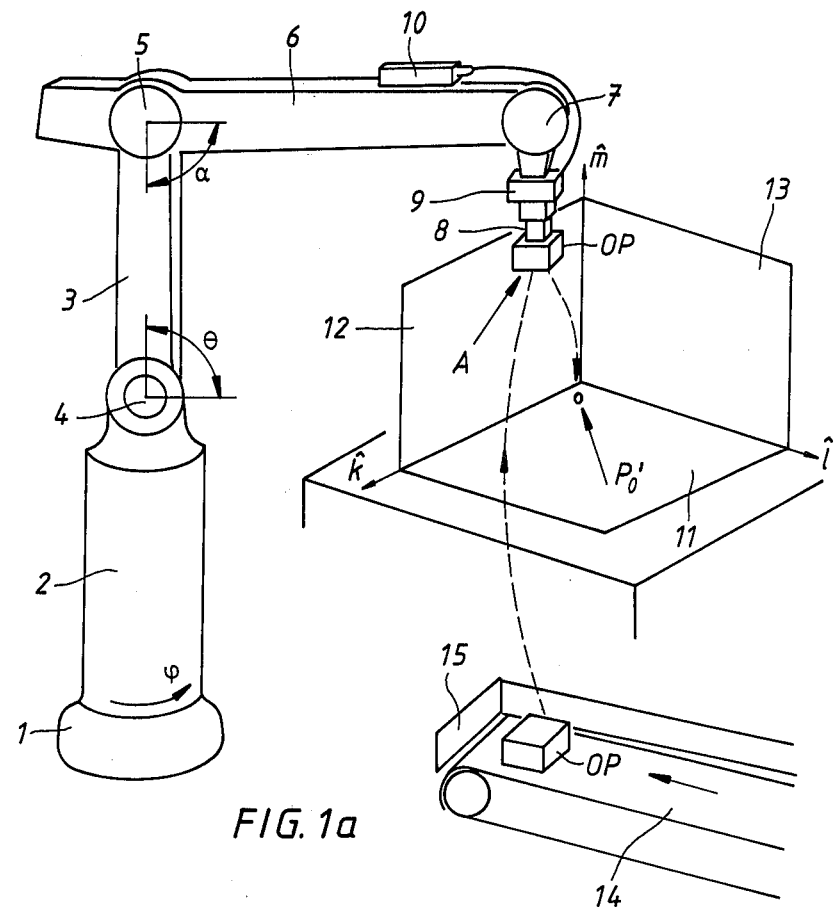
FIGS. 1a, 1b, 1c, show the principle of placing workpieces in a magazine.

The robot is of a so-called anthropomorphic type. A robot of the present type is previously known from, for example, U.S. Pat. No. 4,076,131. The robot has a stand 1 on which there is arranged a column 2 rotatable around a vertical axis. A first arm 3 is journalled in a bearing 4 at the upper end of the column and is rotatable around a horizontal axis. The arm 3 has a bearing 5 at its upper end, on which a second arm 6 is journalled and rotatable around a horizontal axis through the bearing. At the extreme end of the arm 6 there is a bearing 7, in which the robot hand 8-9 is rotatably mounted in such a way that the orientation of the hand is independent of the movement of the arms 3 and 6. The robot hand may suitably have the vertical orientation shown in the figure. If necessary, the hand may possibly be rotatable around a vertical axis in the figure. The hand comprises a gripping means 8, which may consist of a suction cup, a mechanical gripping means, an electromagnet, or the like. The gripping means is connected to the robot hand by way of a sensor 9. This may be of the type described in the above-mentioned U.S. patent. The sensor emits signals which correspond to the components of the force acting on the gripping means in, for example, three directions perpendicular to each other. The gripping means has an operating member 10 which controls the gripping means in dependence on signals from the control system of the robot.

The robot has three servo-mechanisms which control the three angles of rotation shown in the figure, $\alpha$, $\theta$, and $\phi$. The robot has a control system (not shown in the figure) which supplies desired values for the three angles to the servos. A certain position in space of the gripping means 8 is unambiguously determined by corresponding values of the angles $\alpha$, $\theta$, and $\phi$. These angles can therefore be said to constitute the coordinate system of the robot. A desired movement path of the gripping means may be programmed by manually displacing the robot along the path and storing the robot coordinates ($\alpha$, $\theta$, $\phi$) for a number of points along the path in the control system. During operation, the control system successively feeds the coordinates for the programmed points to the servos of the robot, and the robot will thus follow the desired movement path.

The delivery point of the robot consists of a horizontal bottom plate 11 and two walls 12 and 13 which are perpendicular to the bottom plate 11 and to each other. The robot shall place the workpieces (a workpiece OP is shown hanging from the gripping means 8) in the hopper in a predetermined pattern (see further below).

The workpieces are transported on a conveyor belt 14 and are arrested against a stop means 15. This position of the workpieces is the collection point of the robot.

The robot has a starting position A located outside the volume which is occupied by the workpieces in the fully loaded magazine 11, 12, 13. The starting position is suitably arranged so that the robot may pass from that position directly to any place in the magazine without colliding with a previously positioned workpiece.

When starting the procedure, the robot goes from the starting position A to the collection point and grips a workpiece. The robot then passes via the point A to a point $P_0'$ which is an initial position for the first workpiece. This point is chosen so that it is positioned in the vicinity of the position adopted by the first workpiece when this is placed in contact with both the bottom plate 11 and the walls 12 and 13, that is, when the workpiece is moved into the corner formed by the plate and the walls. The point $P_0'$ is, however, displaced to such an extent outwardly from the corner that the workpiece in position $P_0'$ is definitely not in contact with the plate or the walls.

When the robot has reached point $P_0'$, the so-called sensor control is started to finally locate the workpiece in the corner. This sensor control can be performed in the manner described in the above-mentioned U.S. patent. The three sensing directions of the sensor, x, y, z, may be assumed to approximately correspond to the axes $\hat{k}$, $\hat{l}$, $\hat{m}$ in the figure. The robot is controlled during the sensor control in dependence on the output signals of the sensor towards the corner until the forces, sensed by the sensor, in the x-, y-, and z-direction are within predetermined intervals and thus indicate that the workpiece makes contact with the plate 11 as well as the walls 12 and 13. The robot then releases the workpiece and moves via the point A to the collection point and grips a new workpiece. The new workpiece is transported to an initial position determined for the new workpiece and is then placed in position in the pattern by means of sensor control. In this way the robot places workpiece after workpiece in position until the magazine is full, whereafter the robot returns to its initial position A.

Figure 1B:
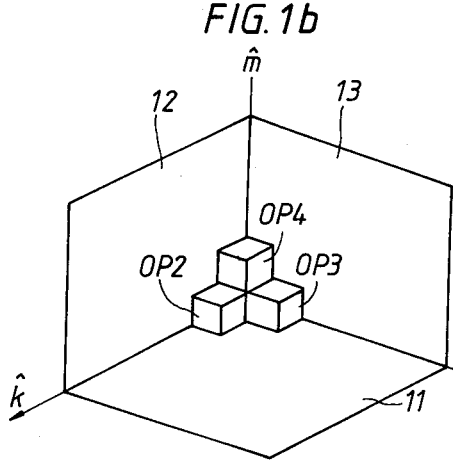

FIG. 1b shows how a number of workpieces may be positioned. The first workpiece OP1 (not shown) may be positioned furthest away in the corner. The next workpiece OP2 is placed close to OP1, etc., in the k-direction until a desired number of workpieces have been placed in this first row. After this the first workpiece, OP3, is placed in the next row. When all rows are filled, the first workpiece, OP4, at the next level is placed. When the desired number of levels have been filled in this way, the robot returns to its starting position A.

Figure 1C:
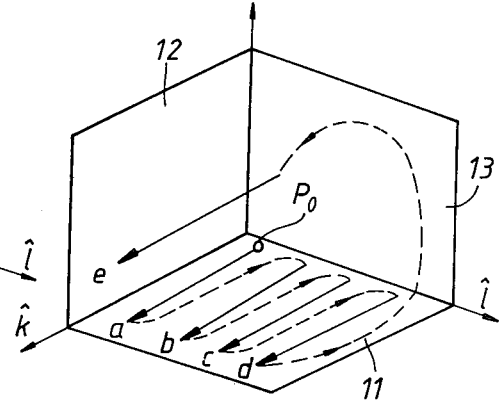

FIG. 1c shows the position $P_0$ for the first workpiece and how the rows a, b, c, d at the first level are filled by turn. When the last row d at the first level is filled, the robot starts with the first row e at the second level, and so on, until the hopper is full.

Figure 2A:
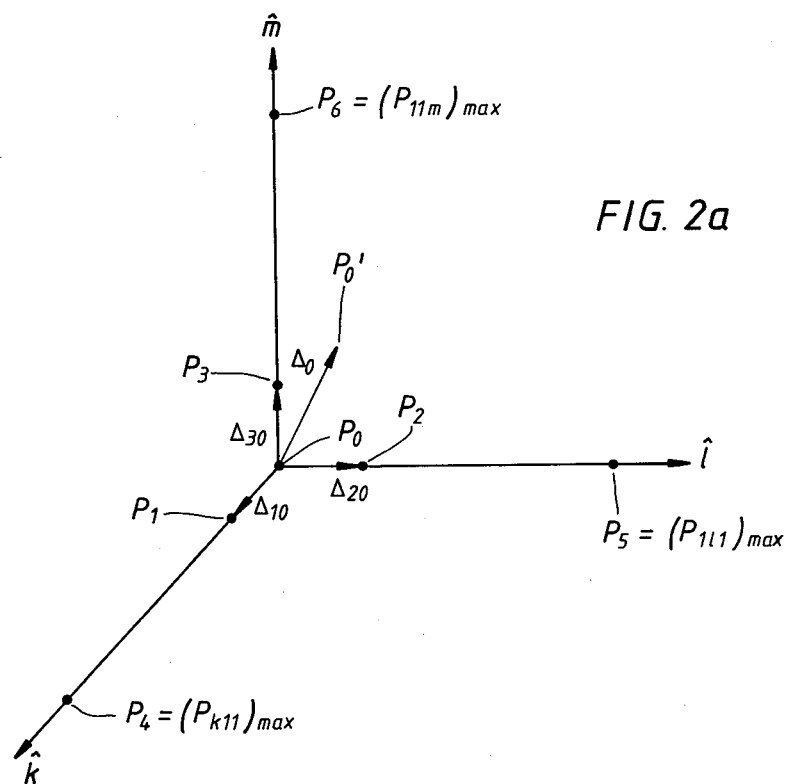
FIGS. 2a, 2b, 2c, show the quantities used in the method according to the invention.

FIG. 2a shows a point $P_0$ located at the origin of the coordinate system. The point $P_0$ is the pre-programmed position of the first workpiece. Point $P_1$ is the preprogrammed position of the second workpiece. Point $P_2$ is the preprogrammed position of the first workpiece in the next row, and point $P_3$ is the preprogrammed position of the first workpiece at the second level. Points $P_0$–$P_3$ may be entered into the program by running the robot manually to the respective point, and the positions on the robot coordinates (e.g. $\alpha_0$, $\theta_0$, $\phi_0$ for point $P_0$) read at each point are then stored in a memory in the control system.

The control system is arranged to calculate the three vectors $\Delta_{10}$, $\Delta_{20}$, $\Delta_{30}$. The three components of the vector $\Delta_{10}$ are thus $(\alpha_1 - \alpha_0)$, $(\theta_1 - \theta_0)$ and $(\phi_1 - \phi_0)$, and the corresponding values apply to the other vectors.

Further, the above-mentioned point $P_0'$ is programmed and the vector $\Delta_0$ is calculated, the so-called offset vector.

The limits to the extension of the pattern may be set by programming three points $P_4$, $P_5$ and $P_6$, which denote the maximum extension of the pattern in the k-, l-, and m-directions. Alternatively, the number of workpieces in each row (K), the number of rows (L) at each level, and the number of levels (M) may be programmed. This latter method will be used in the following description.

The final positions of the workpieces after positioning in the pattern are designated $P_{klm}$, where k designates the serial number of the workpiece in the row, l designates the serial number of the row at the level, and m designates the serial number of the level. $P_{klm}'$ designates the preliminary position of each workpiece, and it is this position that consitutites the starting point for positioning by means of sensor control to the final position.

Figure 2B:
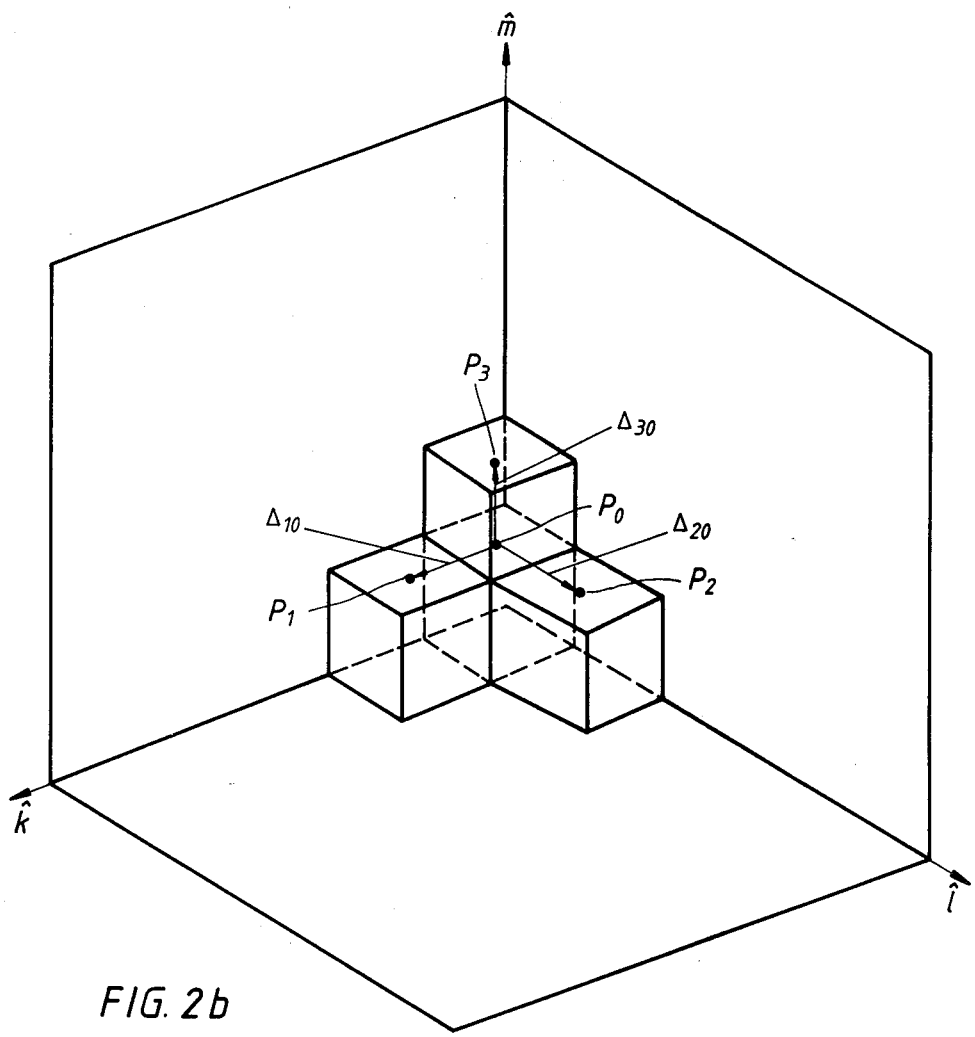

FIG. 2b illustrates points $P_0$–$P_3$ and vectors $\Delta_{10}$, $\Delta_{20}$, and $\Delta_{30}$.

Figure 2C:
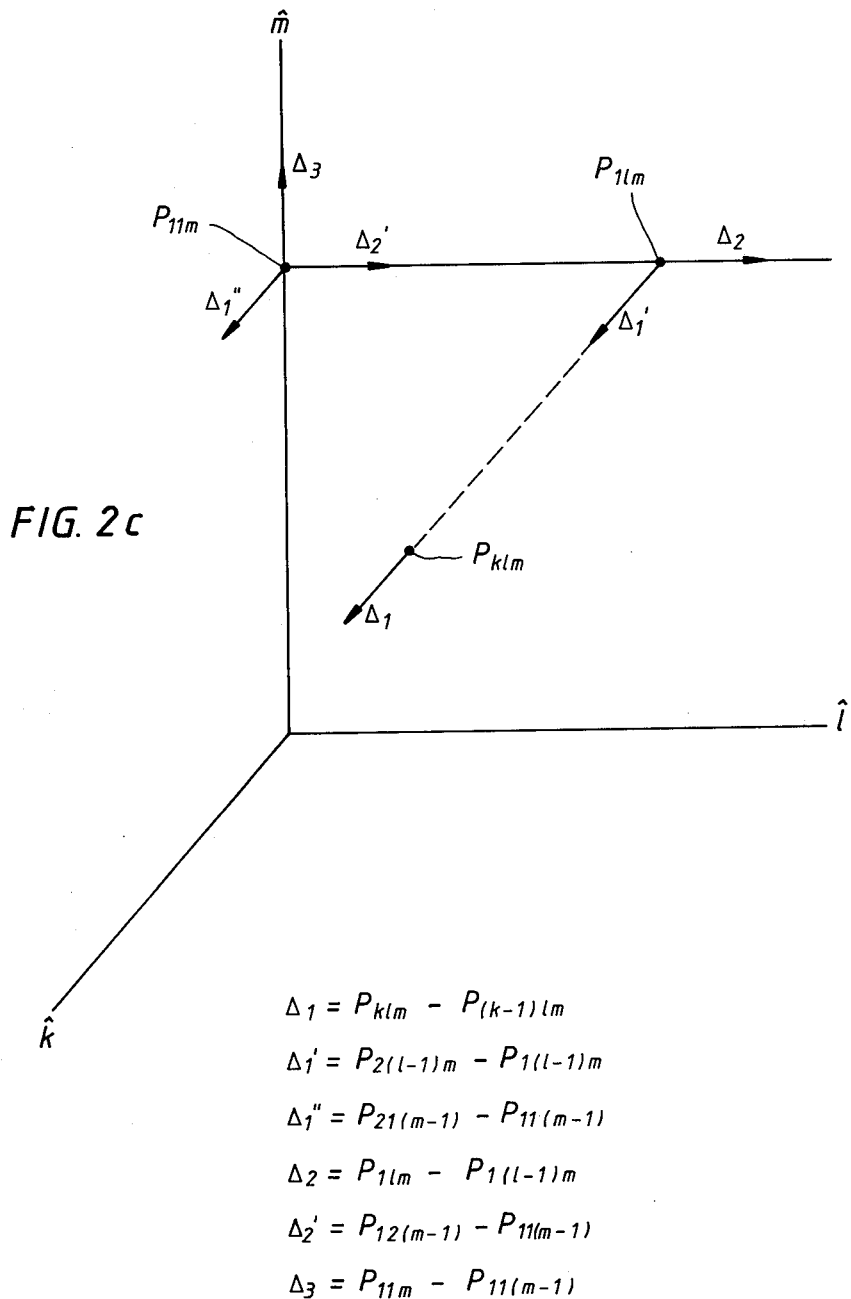

FIG. 2c shows some of the quantities used in the control system. When after completed sensor control, a workpiece has assumed its final position, which is indicated by all sensor signals lying within their predetermined intervals, the position $P_{klm}$ of the workpiece is read off and stored. The preliminary position of an adjacent workpiece is then calculated as $$P' = P_{klm} + \Delta + \Delta_0$$

$\Delta_0$ is the above-mentioned offset vector.

$\Delta$ is calculated in different ways depending on the present position in the pattern.

For movement along a row, the following generally applies:

$$P'_{(k+1)lm} = P_{klm} + \Delta_1 + \Delta_0$$

where $\Delta_1 = P_{klm} - P_{(k-1)lm}$.

If the workpiece is the second in succession in a row, the following generally applies:

$$P'_{2lm} = P_{1lm} + \Delta_1' + \Delta_0$$

where $\Delta_1' = P_{2(l-1)m} - P_{1(l-1)m}$.

If, in addition, the row is the first row at a level, the following applies:

$$P'_{21m} = P_{11m} + \Delta_1'' + \Delta_0$$

where $\Delta_1'' = P_{21(m-1)} - P_{11(m-1)}$.

If, in addition, the level is the first level (m = 1), the following applies:

$$P'_{211} = P_{111} + \Delta_{10} + \Delta_0$$

The preliminary position of the first workpiece on a new row is calculated according to the following:

$$P'_{1(l+1)m} = P_{1lm} + \Delta_2 + \Delta_0$$

where $\Delta_2 = P_{1lm} - P_{1(l-1)m}$.

For the second row at a level, the following applies:

$$P_{12m'} = P_{11m} + \Delta_2'' + \Delta_0$$

where $\Delta_2' = P_{12(m-1)} - P_{11(m-1)}$.

For the second row at the first level, the following applies:

$$P_{121'} = P_{111} + \Delta_{20} + \Delta_0$$

The preliminary position for the first workpiece at a new level is calculated as $$P_{11'(m+1)} = P_{11m} + \Delta_3 \Delta_0$$

where $\Delta_3 = P_{11m} - P_{11(m-1)}$.

For the first workpiece at the second level, the following applies:

$$P_{112'} = P_{111} + \Delta_{30} + \Delta_0$$

As will be clear from the above, the starting point for calculating the position of a new workpiece is always the final position, sensed and stored by the robot, of a previous workpiece located immediately adjacent thereto. Generally, the position of the immediately preceding workpiece in the same row is used as the starting position. If the workpiece is the first in a row (k=1), the position of the first workpiece in the immediately preceding row is used. If the workpiece is the first (k=l=1) at a level, the position of the first workpiece at the immediately preceding level is used. The only exception is the first workpiece at the first level.

To the starting position used there is added, as will be clear from the above description, a vector $(\Delta \alpha, \Delta \theta, \Delta \phi)$ corresponding to the spacing in the k-, l-, or m-direction of the pattern, that is, the length, width, and height of the workpieces in the example described. This vector has been designated $\Delta$ above. This vector is calculated, as is clear from the above, as the difference between the final positions of two already positioned workpieces, which are as close as possible to the workpiece to be positioned. For calculating the vector $(\Delta_1)$ there are generally used the positions of the two immediately preceding workpieces in the row. For the second workpiece in a row, the vector $(\Delta_1')$ is calculated from the positions of the two first workpieces in the immediately preceding row. For the second workpiece in the first row at one level, the positions of the first two workpieces at the preceding level are used for calculating the vector $(\Delta_1'')$. For the second workpiece in the first row of the first level, the programmed vector $\Delta_{10}$ is used. For the first workpiece in a new row, the vector $(\Delta_2)$ is calculated from the positions of the first workpieces in the two preceding rows. For the first workpiece in the second row at one level, the vector $(\Delta_2')$ is calculated from the positions of the first workpieces in the first two rows at the preceding level. For the first workpiece in the second row of the first level, the programmed vector $\Delta_{20}$ is used. For the first workpiece at a new level, the vector $(\Delta_3)$ is calculated from the positions of the first workpieces (k=l=1) at the two preceding levels, and for the first workpiece at the second level, the programmed vector $\Delta_{30}$ is used.

In the method now described, the real values of position and division of the immediately adjacent workpiece are used all the time for calculating the position of the next workpiece. The pattern therefore adapts automatically to variations in position, shape or size of the workpieces or the hopper. The function is relatively independent of the accuracy of programming.

Further, the programming will be extremely simple. The pattern is defined through the four programmed points $P_0$–$P_3$ and by the three numbers or points ($P_4$–$P_6$) which denote the maximum extension of the pattern. The programming work is therefore very insignificant, and it is independent of the number of workpieces.

Further, the method requires a very limited memory capacity of the control system.

Further, the method requires only a simple control system. Since adjacent points are used all the time as starting position and for calculating the division, all calculations may be performed as simple additions and subtractions directly in the robot coordinates. This is a considerable advantage, especially in robots with a complex geometry of movement, for example anthropomorphic robots, where coordinate transformations between the coordinate system (k, l, m) of the pattern and the coordinate system of the robot are extremely complicated and require considerable calculating capacity.

Figure 3:
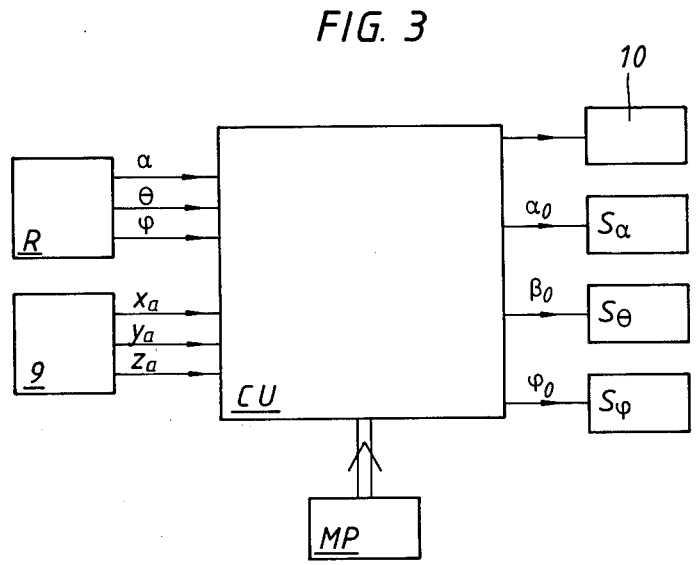
FIG. 3 shows the connection of the control system to input and output members in a robot according to the invention.

In the following a description will be made of an industrial robot for carrying out the method now described. The robot, its force transducer (sensor) and control system have already been briefly described with reference to FIG. 1a. FIG. 3 shows schematically the control system of the robot. The control unit proper, CU, may consist of a microcomputer or a unit specially made for the purpose, having necessary memories, counters and logic circuits. The control unit CU receives signals from the resolvers of the robot servos about the current values of the three robot coordinates $\alpha$, $\theta$ and $\phi$. Further, from the sensor 9 information is obtained about the forces $x_a$, $y_a$, $z_a$ acting on the workpiece in the three sensing directions of the sensor. A programming unit MP is further connected to the control unit CU and contains operating and indicating members by means of which the robot can be controlled to the desired position and this position be stored in the control unit, and by means of which necessary instructions concerning sensor control, control of gripping means 8, etc., may be entered into the program and stored in the control unit CU.

The control unit CU emits output signals to the three robot servos $S_\alpha$, $S_\theta$, and $S_\psi$ in the form of desired values $\alpha_0$, $\theta_0$, and $\phi_0$, as well as control signals to the operating device 10 of the gripping means 8.

Figure 4:
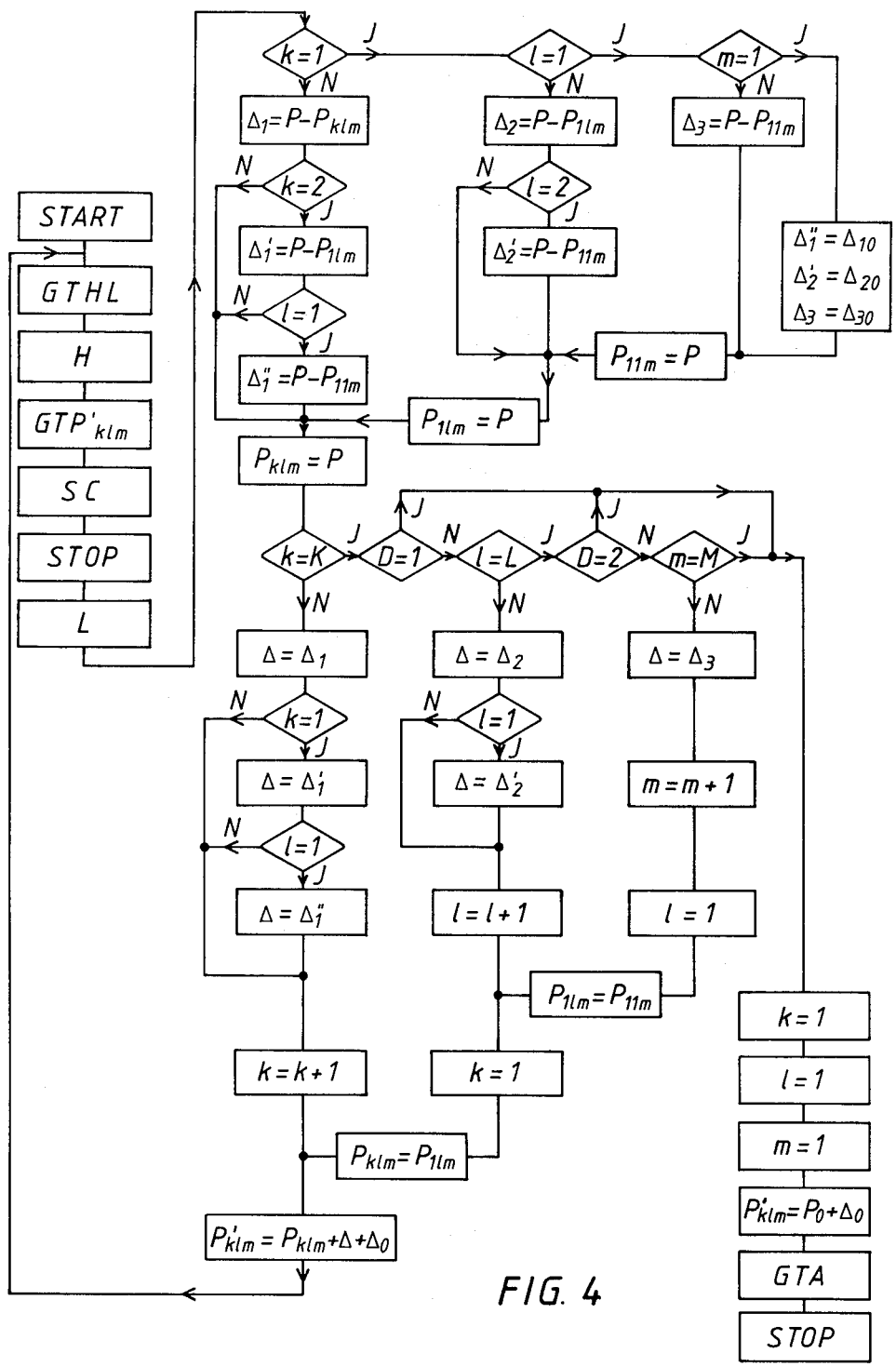
FIG. 4 shows in the form of a flow chart how the control system is built up and operates.

The detailed construction of the control unit CU may be carried out in many different ways. FIG. 4 shows in the form of a flow diagram the operation of the control unit CU, and in the case where the control unit CU consists of a microcomputer this flow diagram may constitute the direct basis for the programming.

In the flow diagram of FIG. 4:

P designates the actual position of the workpiece in question;

klm designates the coordinate number of the workpiece in question;

K designates the number of workpieces in the k-direction in the pattern;

L designates the number of workpieces in the l-direction in the pattern;

M designates the number of workpieces in the m-direction in the pattern;

D designates the dimension of the pattern (uni-, two-, or three-dimensional);

N indicates "no";

J indicates "yes";

$P_{klm}'$ indicates the preliminary position for the next workpiece.

In addition, the control unit employs the previously described variables $\Delta_1$, $\Delta_1'$, $\Delta_1''$, $\Delta_2$, $\Delta_2'$, $\Delta_3$, $\Delta$. Further, the following variables are used:

$P_{11m}$, which is the actual value of the first workpiece at the last completed level;

$P_{1lm}$, which is the actual value of the first workpiece in the last completed row; and $P_{klm}$, which is the actual value of the last positioned workpiece.

Before start-up, the vectors $\Delta_0$, $\Delta_{10}$, $\Delta_{20}$, and $\Delta_{30}$ and the coordinates for the point $P_0$ are programmed and stored in the control unit in the manner described previously.

In the following it is assumed that the workpieces shall be placed in a three-dimensional pattern, and the quantity D has therefore been set a D=3 before starting. It is further assumed that both K, L and M are greater than or equal to three.

Before start-up, the robot is in its starting position A. A start signal can be given manually or automatically (e.g. by a workpiece striking against the stop 15 in FIG. 1a). When a start signal has been given, the robot moves to the collection point (GTHL), the gripping means grips a workpiece (H). The robot is then controlled to point $P_{klm}'$ ($GTP_{klm}'$). On the arrival of the robot at this point, the robot changes to sensor control (SC), and the workpiece is controlled into contact in the k-, l-, and m-directions with previously positioned workpieces or with the walls of the hopper. When the sensor indicates that the workpiece has reached its final position (all the sensor signals within their predetermined intervals) the robot coordinates for this position (STOP) and stored. The gripping means is then controlled so that the workpiece is released (L).

After this, the calculation of the preliminary position for the next workpiece is started. In the flow diagram, this calculation covers the operations from the comparison k=1 on to the calculation of the final result $P_{klm}' = P_{klm} + \Delta + \Delta_0$.

As can be seen from the operations which precede the instruction STOP, which ends the pattern lay-out, the system sets k=l=m=1. Further, it sets $P_{klm}' = P_0 + \Delta_0$ is set and the robot is controlled to its initial position A (GTA).

Thus, upon start-up k=l=m=1 and $P_{klm}' = P_0 + \Delta_0$. The robot is therefore controlled to the point $P_{111}' = P_0 + \Delta_0$, that is, the point $P_0'$ in FIG. 2a, and the final position of the workpiece after the sensor control, i.e. $P_{111}$, is sensed and stored. Since k=l=m=1, the following is set:

$$\Delta_1'' = \Delta_{10}$$

$$\Delta_2' = \Delta_{20}$$

$$\Delta_3 = \Delta_{30}$$

$$P_{11m} = P_{111}$$

$$P_{1lm} = P_{111}$$

$$P_{klm} = P_{111}$$

Since $k \neq K$ and k=l=1, $\Delta = \Delta_1'' = \Delta_{10}$. Thereafter k is increased by 1, that is, to k=2. Finally, the preliminary position for the second workpiece is calculated:

$$P_{211}' = P_{111} + \Delta_{10} + \Delta_0$$

After positioning by means of sensor control, this workpiece adopts the fnnal position $P_{211}$.

Since k=2 and l=1, the following is calculated:

$$\Delta_1 = P - P_{klm} = P_{211} - P_{111}$$

$$\Delta_1' = P - P_{1lm} = P_{211} - P_{111}$$

$$\Delta_1'' = P - P_{11m} = P_{211} - P_{111}$$

whereafter the system sets $$P_{klm} = P_{211}$$

Since $k \neq K$ still applies, the following is set:

$$\Delta = \Delta_1 = P_{211} - P_{111}$$

whereafter k is increased to k=3 and $P_{311}'$ is computed to $$P_{311}' = P_{211} + \Delta_1 + \Delta_0$$

After positioning workpiece number three, a new value of $\Delta_1$ is calculated, namely $\Delta_1 = P - P_{klm} = P_{311} = P_{211}$. This value of $\Delta_1$ is used for calculating the preliminary position of workpiece number four. On the other than the previously calculated values of $\Delta_1'$ and $\Delta_1''$ are not changed, and these values shall be used for calculating the preliminary positions of the second workpiece in row number two, and of the second workpiece of row number one at the next level, respectively.

After K workpieces have been placed in row number one, $\Delta = \Delta_2' = \Delta_{20}$ is set, since k=K, D≠1, l≠L and l=1, after which l is increased to 2, k is set at 1 and $P_{klm}$ is set at $P_{1lm} = P_{111}$. The preliminary position of workpiece number one in row number two is thus $$P_{121}' = P_{111} + \Delta_{20} + \Delta_0$$

After positioning this workpiece, the following is calculated (since K=1, l≠1 and l=2):

$$\Delta_2 = P - P_{1lm} = P_{121} - P_{111}$$

and $$\Delta_2' = P - P_{11m} = P_{121} - P_{111}$$

$\Delta_2$ and $\Delta_2'$ are used for calculating the position of the first workpiece in row three and of the first workpiece of row two at the next level.

Row by row the robot operates in this way, and when workpiece K in row L has been placed, level 1 is full.

Now, since k=K, D≠1, l=L, D≠2 and m≠M, $\Delta = \Delta_3 = \Delta_{30}$ is now set, m is increased to 2, k and l are set at 1 and the variables $P_{1lm}$ and $P_{klm}$ are set at $$P_{1lm} = P_{klm} = P_{11m} = P_{111}$$

The preliminary position of the first workpiece at the next level is therefore $$P_{112}' = P_{111} + \Delta_{30} + \Delta_0$$

After positioning this workpiece, the following is set $$\Delta_3 = P - P_{11m} = P_{112} - P_{111}$$

and $$P_{11m} = P_{1lm} = P_{klm} = P_{112}$$

The workpieces at this level are therefore placed in the same manner as at level one.

The stored value of $\Delta_3$ is then used to calculate the preliminary position of the first workpiece at the third level $$P_{113}' = P_{112} + \Delta_3 + \Delta_0$$

When all workpieces at level M (the uppermost level in the pattern) have been placed, $k=K$, $l=L$ and $m=M$. The control system therefore sets $k=l=m=1$ and calculates the position of the first workpiece when laying out the next pattern as $$P_{klm}' = P_{111}' = P_0 + \Delta_0$$

The robot is thereafter controlled to the starting position A and stops there. After a start signal has been given, the system is now prepared to commence the laying out of a new pattern, which is identical with that described above.

The most general case, the three-dimensional pattern, has been described above.

A two-dimensional pattern, that is, one single layer of workpieces having L rows with K workpieces in each row, may be laid by setting the variable D at 2 (or by setting $M=1$). A unidimensional pattern, that is, one single row with K workpieces, may be laid by setting the variable at 1 (or by setting $L=M=1$).

The control system now described may be used with a slight modification also for collecting workpieces which are placed in a unidimensional, two-dimensional, or three-dimensional pattern. An approximate position for the first workpiece to be collected, three points or vectors indicating the spacing along the three axes of the pattern, and three points or numbers indicating the extension of the pattern are then entered into the program, all in a manner corresponding to that described above.

If desired, the above-described control system may be modified in a simple manner if the number of workpieces per row and the number of rows per level is not to be constant.

If necessary, the sensor signals from the sensor 8 may be transformed to the coordinate system of the robot, for example with the help of the approximate method of transformation as has been described in U.S. Pat. No. 4,166,543.

In the embodiment described, it has been presupposed that the sensor 9 is of the force-sensing type as disclosed in U.S. Pat. No. 4,076,131. Alternatively, of course, sensors of a different type may be used, for example sensors having optical or electromagnetic transducers.

In the above description, the workpieces at the same level have been placed immediately adjacent to each other. With a suitable type of sensor, of course, the workpieces may be placed at a certain distance from each other, if desired.

The invention is not limited to the example described above, in which the workpieces consist of rectilinear parallelepipeds. On the contrary, the workpieces may have an arbitrary shape.

It may be desirable for the pattern to have different structure at different levels, for example such that the workpieces at one level secure the workpieces at the preceeding level by being placed above the "joints" between the workpieces at the preceding level. The embodiment and the means described above may be modified in a simple manner within the scope of the invention, so that this function is obtained, for example by the workpieces at each level being positioned displaced in the k- and l-directions with respect to the workpieces at the preceding level.

It may be suitable to design the method and the means according to the invention such that the pattern lay-out does not have to be made again from the start if, for example because of a power failure, the lay-out is interrupted before the whole pattern has been laid. By manually displacing the robot, upon a re-start, to the point where the lay-out was interrupted and programming points $P_0$–$P_3$ at that point, as described above, and by supplying the robot with information, for example about the remaining number of workpieces in the row in question, the remaining rows at the level in question and the remaining number of levels, the commenced lay-out may be completed.

I claim:

1. A method for handling workpieces (OP) with an industrial robot (1–10), which are arranged or are to be arranged in a pattern, wherein said robot is provided with sensing members (9) which are arranged to sense the position of the robot or of a workpiece carried by the robot relative to the workpieces positioned in the pattern, comprising the steps of,
    controlling the robot or a workpiece carried by the robot to adopt a predetermined preliminary position relative to workpieces already positioned in the pattern,
    utilizing said sensing members, controlling said robot or a workpiece carried thereby to assume a final position,
    storing said final position,
    utilizing said stored final position as a starting value, calculating the preliminary position of an adjacent workpiece in the pattern, and
    controlling said robot or a workpiece carried thereby to assume said calculated preliminary position.

2. A method according to claim 1, characterised in that said step of calculating the preliminary position ($P_{klm}'$) of an adjacent workpiece is effected by adding a vector ($\Delta$), corresponding to the spacing of the pattern, to the coordinates for said stored final position.

3. A method according to claim 2, characterised in that the vector ($\Delta$) corresponds to the spacing of the pattern in a certain direction, and is calculated as the difference between the coordinates for the final positions of two workpieces located one after the other in said direction and adjacent to the position in said pattern of said adjacent workpiece.

4. A method according to claim 2, characterised in that an offset vector ($\Delta_0$) is further added to the coordinates for the stored final position ($P_{klm}$), said offset vector being chosen such that the workpiece or the robot in the preliminary position ($P_{klm}'$) is definitely not in contact with any workpiece placed in the pattern.

5. A method according to claim 1 for generating a pattern with a row of workpieces located one after the other in a certain direction (e.g. k-direction), characterised in that as the starting point for calculating the preliminary position ($P_{klm}'$) of a workpiece there is used the final position ($P_{(k-1)lm}$) of the preceding workpiece in the row, and that the spacing ($\Delta_1$) is calculated as the difference between the coordinates for the final positions ($P_{(k-1)lm}$ and $P_{(k-2)lm}$) of the two preceding workpieces.

6. A method according to claim 5 for generating a pattern with several adjacently positioned rows of workpieces, characterised in that as the starting point for calculating the preliminary position ($P_{1lm}'$) of the first workpiece in each row there is used the final position ($P_{(k-1)lm}$) of the first workpiece in the preceding row, and that the spacing ($\Delta_2$) is calculated as the difference between the coordinates for the final positions ($P_{1(l-1)m}$ and $P_{1(l-2)m}$) of the first workpieces in the two preceding rows.

7. A method according to claim 6 for generating a pattern with several levels of workpieces located above each other, characterised in that as the starting point for calculating the preliminary position ($P_{11m}'$) of the first workpiece at one level there is used the final position ($P_{11(m-1)}$) of the first workpiece at the preceding level, and that the spacing ($\Delta_3$) is determined as the difference between the coordinates for the final positions ($P_{11(m-1)}$ and $P_{11(m-2)}$) of the first workpieces at the two preceding levels.

8. An industrial robot (1-10) for handling workpieces (OP) which are to be arranged in or are arranged in a pattern, comprising,
workpiece handling means (8, 9,),
sensing members (9) for sensing the position of said workpiece handling means relative to workpieces placed in the pattern and for generating output signals corresponding thereto,
control unit means for controlling the workpiece handling means or a workpiece carried thereby to a calculated preliminary position ($P_{klm}'$) and thereafter, in dependence on said sensing means output signals ($x_a$, $y_a$, $z_z$) to a final position ($P_{klm}$),
said control unit means including calculating means for utilizing said final position as a starting value for calculating the preliminary position of an adjacent workpiece in the pattern.

9. An industrial robot according to claim 8, characterised in that said calculating means comprises means for calculating said preliminary position ($P_{klm}'$) by adding a vector ($\Delta$) corresponding to the spacing of the pattern to the co-ordinates for said final position of said workpiece.

10. An industrial robot according to claim 9, wherein the vector ($\Delta$) corresponds to the spacing of the pattern in a certain direction, characterized in that said calculating means further comprises means for calculating the difference between the coordinates for the final positions of two workpieces arranged one after the other in said direction and adjacent to said adjacent workpiece.

* * * * *